United States Patent
Gorodissky et al.

(10) Patent No.: US 12,051,151 B2
(45) Date of Patent: Jul. 30, 2024

(54) SYSTEM AND METHOD FOR RECONSTRUCTION OF AN ANIMATABLE THREE-DIMENSIONAL HUMAN HEAD MODEL FROM AN IMAGE USING AN IMPLICIT REPRESENTATION NETWORK

(71) Applicant: DE-IDENTIFICATION LTD., Tel Aviv (IL)

(72) Inventors: Or Gorodissky, Tel Aviv (IL); Amitay Nachmani, Tel Aviv (IL); Matan Feldman, Tel Aviv (IL); Eliran Kuta, Tel Aviv (IL); Gil Perry, Tel Aviv (IL); Sella Blondheim, Tel Aviv (IL)

(73) Assignee: DE-IDENTIFICATION LTD., Tel Aviv (IL)

(*) Notice: Subject to any disclaimer, the term of this patent is extended or adjusted under 35 U.S.C. 154(b) by 0 days.

(21) Appl. No.: 18/534,789

(22) Filed: Dec. 11, 2023

(65) Prior Publication Data

US 2024/0221289 A1   Jul. 4, 2024

Related U.S. Application Data

(60) Provisional application No. 63/435,585, filed on Dec. 28, 2022.

(51) Int. Cl.
*G06T 15/20* (2011.01)
*G06T 13/40* (2011.01)
*G06T 17/20* (2006.01)

(52) U.S. Cl.
CPC .......... *G06T 15/205* (2013.01); *G06T 13/40* (2013.01); *G06T 17/20* (2013.01)

(58) Field of Classification Search
None
See application file for complete search history.

(56) References Cited

U.S. PATENT DOCUMENTS

2022/0189104 A1*   6/2022   Wetzstein ............... G06F 3/011

OTHER PUBLICATIONS

Pei-Ze Chiang et al, "Stylizing 3D Scene via Implicit Representation and HyperNetwork", Proceedings of the IEEE/CVF Winter Conference on Applications of Computer Vision (WACV), 2022, pp. 1475-1484, Date Added to IEEE Xplore: Feb. 15, 2022 (Year: 2022).*

Ben Mildenhall et al; NeRF: Representing Scenes as Neural Radiane Fields for View Synthesis; Aug. 3, 2020.

Edoardo Remelli et al; MeshSDF: Differentiable Iso-Surface Extraction; 34th Conference on Neural Information Processing Systems (NeurIPS 2020), Vancouver, Canada, Oct. 31, 2020.

(Continued)

*Primary Examiner* — Tize Ma
(74) *Attorney, Agent, or Firm* — PEARL COHEN ZEDEK LATZER BARATZ LLP (57) ABSTRACT

System and method for reconstructing a three-dimensional (3D) face model from an input 2D image of the face, including: feeding the input 2D image of the first face into a hypernetwork (H) to generate weights for an implicit representation network (IRN); generating, by the IRN with the generated weights, multi-view face images of the first face; and generating the 3D model of the first face by feeding the multi-view face images of the first face into a network trained to generate a 3D face model from the multi-view face images.

15 Claims, 5 Drawing Sheets

(56) References Cited

OTHER PUBLICATIONS

Xiaoming Zhao et al; Generative Multiplane Images: Making a 2D GAN 3D-Aware Jul. 21, 2022.
Tianye Li et al; Learning a model of facial shape and expression from 4D scans; ACM Transactions on Graphics, vol. 36, No. 6, Article 194, Publication date: Nov. 2017.
Jeong Joon Park et al; DeepSDF: Learning Continuous Signed Distance Functions for Shape Representation; Jan. 16, 2019.

\* cited by examiner

SYSTEM AND METHOD FOR RECONSTRUCTION OF AN ANIMATABLE THREE-DIMENSIONAL HUMAN HEAD MODEL FROM AN IMAGE USING AN IMPLICIT REPRESENTATION NETWORK

CROSS-REFERENCE TO RELATED APPLICATIONS

This application claims the benefit of U.S. Provisional Application Ser. No. 63/435,585, filed Dec. 28, 2022, which is hereby incorporated by reference in its entirety.

FIELD OF THE INVENTION

Embodiments of the present invention relate generally to the field of computer graphics. More specifically, embodiments of the present invention relate to reconstruction of a three-dimensional human head model from an image using an implicit representation network.

BACKGROUND

Three-dimensional (3D) human head reconstruction from a single image of a human's face, also referred to as single-view reconstruction (SVR), is a well-known task in the field computer-graphics, where one static image of a human head is used for regressing the parameters of an underlining 3D head parametric model. Using the regressed parameters, a human head mesh may be generated along with a UV texture map and a predefined rig for animation. 3D human head model reconstruction may enable full control of the animated character expression and pose based on the visual input provided in the 2D image.

The SVR task may be complicated, as a single two-dimensional (2D) image may inherently lack some information of both the 3D geometrical structure of the face, commonly referred to as the shape, and its appearance, commonly referred to as the texture. There is a large body of work for 3D reconstruction of the human head from a two-dimensional (2D) image. However prior art studies fail to generate a 3D head model of high quality. There is a need for high quality 3D head reconstruction from an image.

SUMMARY

According to embodiments of the invention, a computer-based system and method for reconstructing a three-dimensional (3D) face model from an input 2D image of the face, may include: feeding the input 2D image of the first face into a hypernetwork (H) to generate weights for an implicit representation network (IRN); generating, by the IRN with the generated weights, multi-view face images of the first face; and generating the 3D model of the first face by feeding the multi-view face images of the first face into a network trained to generate a 3D face model from the multi-view face images.

According to embodiments of the invention, training the hypernetwork (H) may include: obtaining ground truth multi-view images of a second face; feeding one image of the ground truth multi-view images of the second face into the hypernetwork (H) to generate weights for the IRN; generating, by the IRN, generated multi-view images of the second face; calculating a first loss term for the generated multi-view images of the second face; generating the 3D face model of the second face, by feeding the generated multi-view images into the network trained to generate a 3D face model from the generated multi-view face images; rendering, from the 3D face model of the second face, rendered multi-view images of the second face; calculating a second loss term for the rendered multi-view images of the second face; and using the first and the second loss terms to train the hypernetwork (H).

According to embodiments of the invention, the first loss term may include one or more of:
an adversarial loss term for the generated multi-view images generated using a pre-trained discriminator (A) that was trained on the domain of human face images, and a perceptual loss, comparing the generated multi-view images with the ground truth multi-view images, representing the same head poses.

According to embodiments of the invention, the second loss term may include one or more of: a mesh-regularization term, calculated based on a distance between mesh vertices of the 3D face model of the second face and a canonical 3D face model of the second face, and parameter regularization term of the 3D face model of the second face, a perceptual loss between rendered images and the ground truth multi-view image.

According to embodiments of the invention, the canonical 3D face model of the second face may include a faces learned with an articulated model and expressions (FLAME) 3D face model of the second face.

Embodiments of the invention may include: selecting a videoclip of a moving face from dataset of videoclips; and sampling the ground truth multi-view images of the second face from the selected videoclip.

According to embodiments of the invention, images in the generated multi-view images of the second face and the rendered multi-view images of the second face may represent the same head poses as images the ground truth multi-view images of the second face.

According to embodiments of the invention, the 3D model of the first face may include a 3D mesh and a texture UV map.

According to embodiments of the invention, a computer-based system and method for generating a 3D model of a first face from an input 2D facial image of the first face, the method may include: providing the input 2D facial image to a hypernetwork (H) to generate weights for an implicit representation network (IRN); generating, by the IRN with the generated weights, a plurality of facial images of the first face, each with a different view of the first face; and reconstructing the 3D model of the first face by providing the plurality of facial images of the first face to a network trained to generate a 3D face model from the plurality of facial images.

Embodiments of the invention may include training the hypernetwork (H) by: obtaining a plurality of ground truth images of a second face, each with a different view of the second face; providing one image of the plurality of ground truth images of the second face to the hypernetwork (H) to generate weights for the IRN; generating, by the IRN, a plurality of generated images of the second face, each with a view of the second face that corresponds to a view of the second face in one image of the plurality of ground truth images of a second face; calculating a first loss term for the plurality of generated images of the second face; reconstructing the 3D face model of the second face, by providing the plurality of generated images of the second face to the network trained to generate a 3D face model from the plurality of generated images of the second face; rendering, from the 3D face model of the second face, a plurality of rendered images of the second face, each with a view of the second face that corresponds to a view of the second face in one image of the plurality of ground truth images of a second face; calculating a second loss term for the plurality of rendered images of the second face; and using a loss function comprising the first and the second loss terms to train the hypernetwork (H).

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

According to embodiments of the invention, machine learning models disclosed herein, also referred herein as networks, may include one or more artificial neural networks (NN). NNs are mathematical models of systems made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning or training proceeds typically using a loss or cost function, which may for example be a function describing the difference between a NN output and the ground truth (e.g., correct answer). The weight may increase or decrease the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning using the loss function. A NN may be configured or trained for a specific task, e.g., image processing, pattern recognition or classification. Training a NN for the specific task may involve adjusting these weights based on examples (e.g., labeled data included in the training dataset). Each neuron of an intermediate or last layer may receive an input signal, e.g., a weighted sum of output signals from other neurons, and may process the input signal using a linear and/or nonlinear function (e.g., an activation function). The results of the input and intermediate layers may be transferred to other neurons and the results of the output layer may be provided as the output of the NN. For example, in a NN algorithm known as the gradient descent algorithm, the results of the output layer may be compared to the labels of the samples in the training dataset, and a loss or cost function (such as the root-mean-square error) may be used to calculate a difference between the results of the output layer and the labels. The weights of some of the neurons may be adjusted using the calculated differences, in a process that iteratively minimizes the loss or cost until satisfactory metrics are achieved or satisfied. A processor, e.g., central processing units (CPU), graphical processing units or fractional graphical processing units (GPU) or tensor processing units (TPU) or a dedicated hardware device may perform the relevant calculations on the mathematical constructs representing the NN. As used herein a NN may include deep neural networks (DNN), convolutional neural networks (CNN), recurrent neural networks (RNN), long short-term memory networks (LSTM) probabilistic neural networks (PNN), time delay neural network (TDNN), deep stacking network (DSN), generative adversarial networks (GAN), recurrent neural network (RNN), long short-term memory (LSTM), etc. For example, a CNN can be a deep, feed-forward network, which includes one or more convolutional layers, fully connected layers, and/or pooling layers. CNNs are particularly useful for visual applications.

Some algorithms for training a NN model such as gradient descent may enable training the NN model using samples taken from a training dataset. Each sample may be fed into, e.g., provided as input to, the NN model and a prediction may be made. At the end of a training session, the resulting predictions may be compared to the expected output variables, and loss or cost function may be calculated. The loss or cost function is then used to train the NN model, e.g., to adjust the model weights, for example using backpropagation and/or other training methods. Embodiments of the invention may use a loss function. The loss function may be used in the training process to adjust weights and other parameters in the various networks in a back propagation process.

A digital image, also referred to herein simply as an image, may include a visual (e.g., optical) representation of physical objects, specifically, a face of a human, provided in any applicable digital and computer format. Images may include a simple 2D array or matrix of computer pixels, e.g., values representing one or more light wavelengths or one or more ranges of light wavelength, within the visible light, in specified locations, or any other digital representation, provided in any applicable digital format such as jpg, bmp, tiff, etc. A digital image may be provided in a digital image file containing image data.

A 3D head or face model may be a digital representation of a 3D human head, including a 3D mesh and full UV texture map used for animation purposes, e.g., for a 3D animation of the head. The model may further include a rig, e.g., a definition or representations of a digital skeleton that enables the 3D head model to move, e.g., defines how the face and mouth of the 3D head model move when the animated character speaks or how the 3D head model raises an eyebrow. The 3D head model may be provided in any applicable format including .blend .obj .c4d . 3ds .max .ma and many more formats. The 3D mesh may refer to a digital collection of vertices, edges, and polygons (all are computerized mathematical constructs) that together define a computerized 3D object. The vertices are coordinates in the 3D space, the edges each connect two adjacent vertices, and the polygons each enclose adjacent edges to form the surface of the 3D object. A UV texture map may refer to a 2D representation of a 3D object, where the letters "U" and "V" denote the X and Y axes of the 2D representation, e.g., the 2D representation may correspond to the 3D model being unfolded and laid out flat on a 2D plain. The UV texture map may be used to generate a 3D model in a 3D modeling process, referred to as wrapping, by projecting the 2D representation (e.g., the UV texture map) onto the surface of the 3D model.

Currently, the 3D faces learned with an articulated model and expressions (FLAME) model is the most dominant 3D head model used. Its output is a discrete explicit 3D mesh representation (e.g., 3D vertices, edges, and polygons) of a human face, alongside blendshapes and joints which allow controllable shape (e.g., the external form), expression (a look on the model's face that conveys a particular emotion) and pose (e.g., a particular position of the head).

Another parallel area of research is implicit scene representation, implicit representation, or neural implicit representation, which aims to describe a scene by a continuous implicit function. The continuous implicit function should accurately represent the image signal. That is, if a system passes the implicit function a pixel coordinate and pixel shape (height, width) as input, the implicit function may output the correct value for that pixel (e.g., pixel value in whichever representation used, e.g., red, green and blue (RGB) or other). Neural implicit representations use an NN to implement or estimate the continuous implicit function. By training on discretely represented samples of the same signal, the NN may learn to estimate the underlying (continuous) function. The simplest implementation is a signed distance function (SDF), which predicts a per-coordinate distance value, defining a shape surface by observing a constant isosurface, e.g., a 3D surface representation of points with equal values, with DeepSDF being the first deep-learning NN based solution of that manner. The key advantage of implicit representations over explicit ones is their continuity, e.g., not being limited to a pre-allocated grid size, that enables a fine-detailed representation of a scene.

However, currently only explicit representations, mostly mesh objects, may be used by computer graphic engines, thus a conversion from implicit representation to an explicit model is beneficial to exploit an obtained high-resolution implicit representation.

The most common algorithm to generate an explicit 3D model from an SDF representation is marching cubes, which iteratively goes over all voxels in the 3D grid, defines the isosurface passing through each voxel based on the SDF values of its vertices, to eventually generate an explicit mesh. The main drawback of marching cubes is its non-differentiability, preventing it from being directly used as part of a neural-network training pipeline, thus only a few differentiable algorithms wrapping it were developed.

Recently, the neural radiance fields (NeRF) method, that includes novel view synthesis (NVS) abilities has been introduced. The NeRF models may render non-existing views of the learnt scene using NNs to predict the color and density (a property related to opacity and depth) of an instance at each coordinate. Nonetheless, NeRF models take the multi-view approach, expecting an input of multiple shots surrounding the scene, from known camera positions, either by using fixed camera positions or applying structure-from-motion algorithms.

The first is an implicit representation network (IRN), which takes a single view image of a human face to render several constant view images of it; using a pre-learnt prior of human face appearance at those specific camera positions to overcome the inherent lack of information given a sole image. In practice, the architecture of an already-existing IRN backbone (IRN) will be used, and only a lightweight hypernetwork (H) will be trained—predicting the weights of the backbone network.

Embodiments of the invention may provide a system and method for generating or reconstructing a 3D head model, usable for computer amination, based on a single 2D input image of the face. Embodiments of the invention may generate multi-view face images of a face, (e.g., a plurality of images, each with a different view of the face), based on the single 2D image of the face, using an implicit representation network (IRN) and an hypernetwork (H) trained to generate weights for the IRN. The IRN may take a single view image of a human face and render several constant view images of it, relaying a pre-learnt human face appearances at those specific camera positions to overcome the inherent lack of information provided by a sole image. In practice, the architecture of an already-existing IRN may be used as a backbone network, and only a lightweight hypernetwork (H) may be trained to predict the weights of the backbone network.

The multi-view face images generated by the IRN may be used to generate a 3D face model, e.g., using another network that is trained to generate a 3D face model from multi-view face images. The multi-view face images may include images of the same face, each in a different view, e.g., each with a different head pose and/or images of the face that were taken from a plurality of different angles.

A hypernetwork (H), also referred to as a hypernet or an auxiliary network, may include a NN that may generate weights for another NN, known as the backbone, target, main or primary network, in this case the IRN. Training the hypernetwork (H) may replace the traditional methods of weight initialization and optimization of the main network, such as backpropagation and gradient descent. Instead, hypernetwork (H) may be trained to produce weights that optimize the performance of the main network for a given task. Hypernetworks may offer several advantages over training the main network as they provide more dynamic weight generation, which may adapt in a less computationally intensive process to different inputs and tasks.

Embodiments of the invention may improve prior technology and provide an IRN for converting a single image (with a single view of the face) to multi-view images, each with a different view of the face, later to be used for generating a 3D face model. e.g., for generating the parameters for the 3D face model. Thus, embodiments of the invention may improve the technology of computer animation by enabling the generation of a high-quality, fine-detailed 3D animatable avatar from a single 2D face image, in contrast with current known methods which require at least a monocular video of a face as an input. The animatable 3D human head generated using embodiments of the invention may be useful for many commercial applications, including gaming, movie production, e-commerce, e-learning, video photography, face anonymization, etc.

Thus, embodiments of the invention may take advantage of implicit scene representations to render highly-detailed multi-view images using just a single shot, resulting in a high resolution 3D animatable avatar. Moreover, the learnt avatar (e.g., the 3D face model) may be reenacted using input videos of other characters, e.g., make the generated 3D face model repeat movements of a 3D head in a video, by regressing parameters of the 3D head in the video in each frame (e.g., using an NN), then applying them to the avatar representation and rendering the outcomes.

Figure 1:
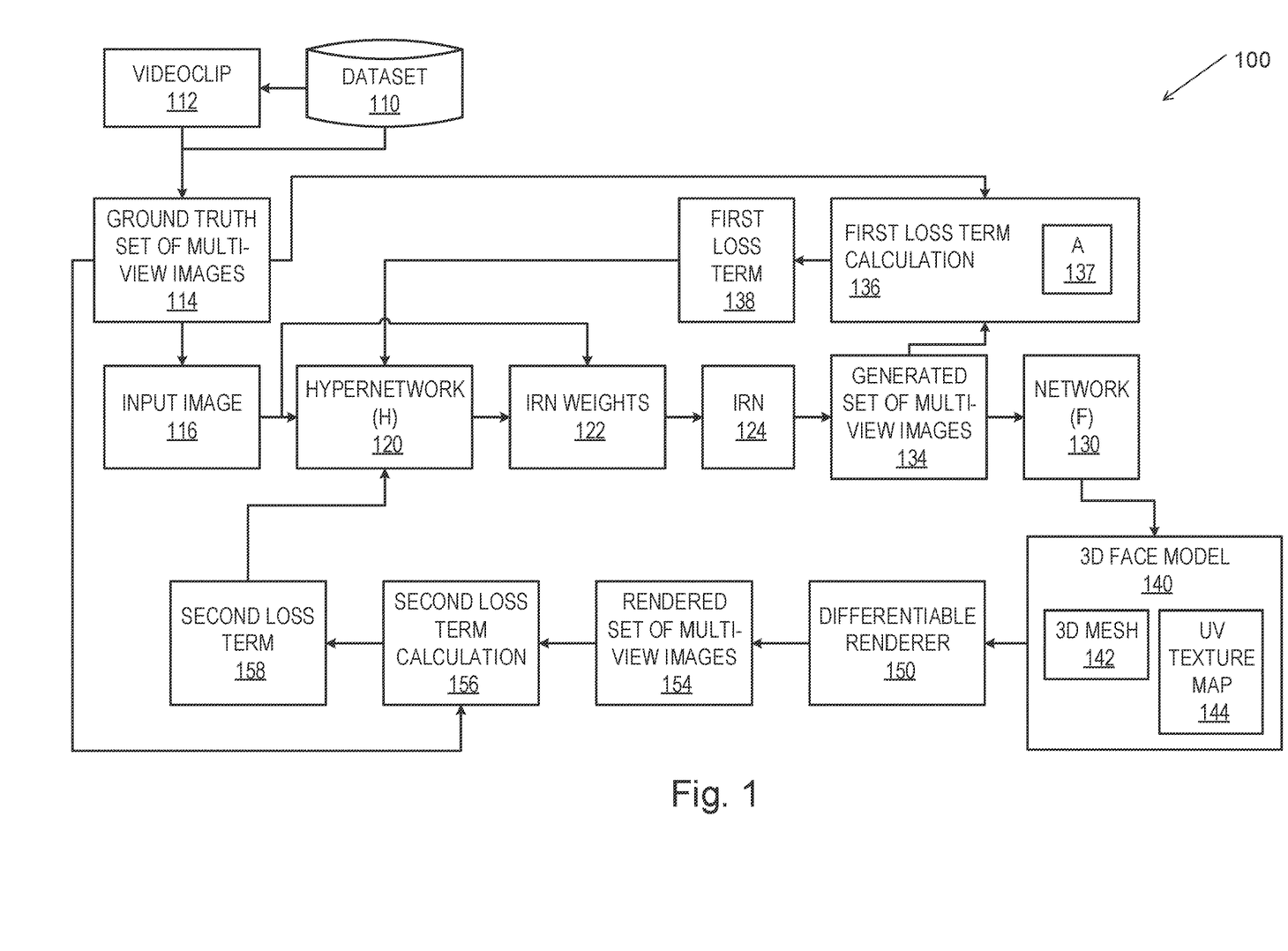
FIG. 1 depicts a system for training a hypernetwork (H) to generate weights for an implicit representation network (IRN), according to embodiment of the invention.
Figure 5:
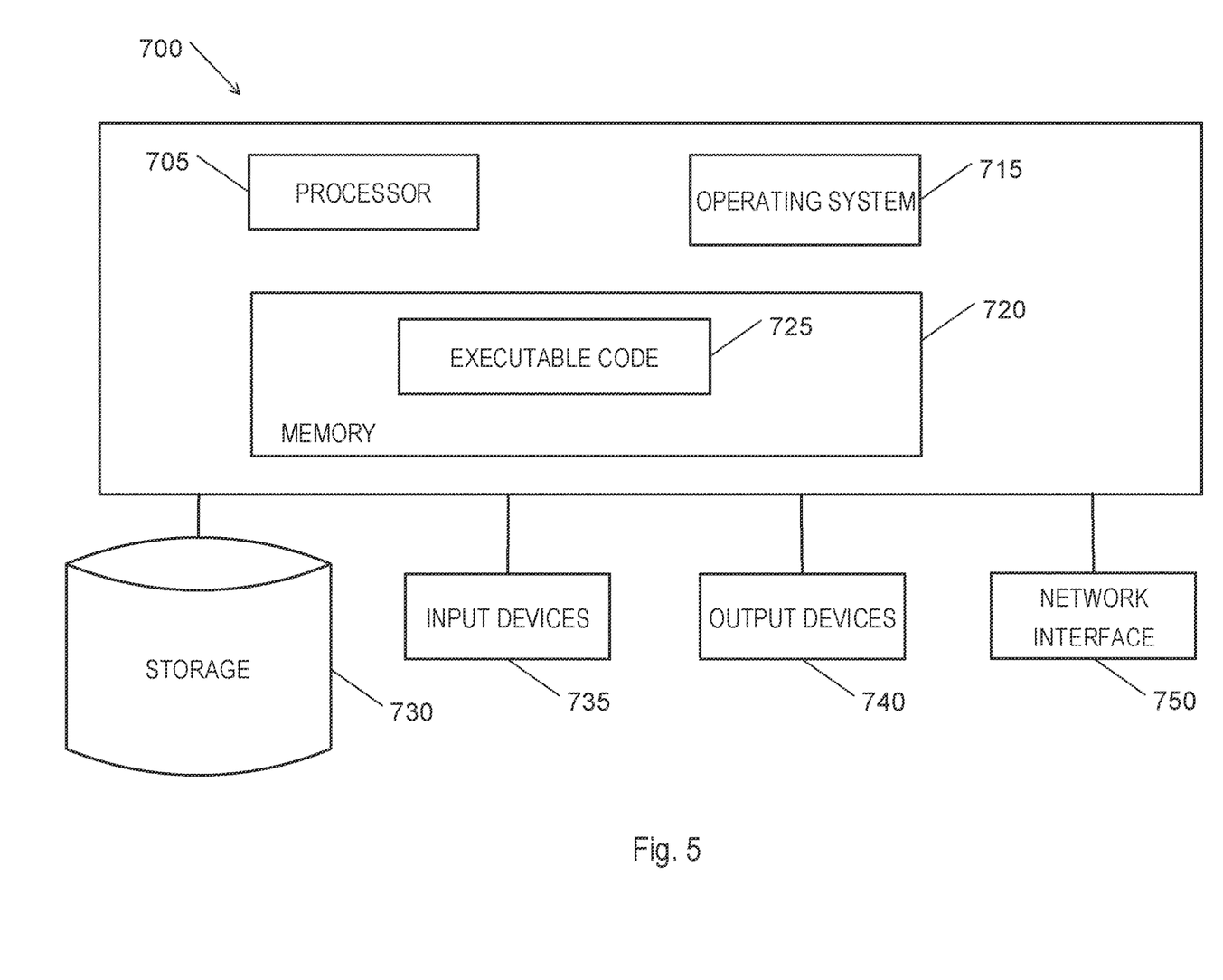
FIG. 5 shows a high-level block diagram of an exemplary computing device which may be used with embodiments of the present invention.

Reference is made to FIG. 1, which depicts a system 100 for training a hypernetwork (H) 120 to generate weights for an IRN 124, according to embodiments of the invention. It should be understood in advance that the components, and functions, shown in FIG. 1 are intended to be illustrative only and embodiments of the invention are not limited thereto. While in some embodiments the system of FIG. 1 is implemented using systems as shown in FIG. 5, in other embodiments other systems and equipment can be used.

Dataset (D) 110 may include a plurality of videoclips 112 (e.g., digital videoclips) of moving faces, where each clip may cover a wide range of head poses and/or camera angles. For example, a videoclip 112 may include a single shot of a head in which the head moves and/or the camera moves around the head. Additionally or alternatively, dataset (D) 110 may include a plurality of ground truth sets 114 of multi-view images (e.g., digital image) of faces, e.g., each ground truth set 114 may include a plurality of images of a single face taken at the same time or at about the same time, from different angles or with different head poses. It is assumed that in each ground truth set 114 of multi-view images the face itself does not change (or substantially does not change) between the images in the set, e.g., only the head pose or the camera angle changes.

For each training iteration, a ground truth set 114 of multi-view images of a face may be used. The set may be retrieved from dataset (D) 110, or sampled from a videoclip 112 retrieved from dataset (D) 110. As its name suggests, ground truth set 114 of multi-view images may be the ground truth set in the training process. In some embodiments, the multi-view images in ground truth set 114 may include constant view images, e.g., images of the same face taken from camera angles and head poses that are constant across ground truth sets 114. For example, in one embodiment, each ground truth set 114 may include a front image, a profile image, a top image and a back image of the face. Other sets, with other number of images, taken from other angles and with different head poses, may be used.

Input image 116 may be selected from ground truth set 114 and provided or fed into a hypernetwork (H) 120 that may generate weights 122 for IRN 124. Hypernetwork (H) 120, also referred to as hypernet or auxiliary network, may include a NN that may be trained to generate weights for IRN 124. In some embodiments only one input image may be selected. In some embodiments more than one input image may be selected.

IRN 124 may obtain input image 116, e.g., a single view image of a human face, and may render or generate generated multi-view images 134, e.g., several multi-view images of the same face. In some embodiments IRN 124 may obtain more than one input image 116 and may generate generated multi-view images 134 from more than one input image 116. IRN 124 may render or generate the multi-view images in generated multi-view images 134 so that the faces in the multi-view images will be in the same head poses and camera angles as in ground truth set 114, so that each image in generated multi-view images 134 may have a corresponding image in ground truth set 114, e.g., an image with the same head pose taken from the same camera angle. Thus, if ground truth set 114 includes a front image, a profile image, a top image and a back image of the face as in the example provided herein, generated multi-view images 134 may also include a generated front image corresponding to the ground truth front image, a generated profile image corresponding to the ground truth profile image, a generated top image corresponding to the ground truth top image, and a generated back image corresponding to the ground truth back image. In some embodiments, an already-existing (e.g., pretrained) IRN may be used, where the weights of IRN 124 may further change as calculated by hypernetwork (H) 120.

First loss term calculation block 136 may calculate first loss term 138 based on differences between generated multi-view images 134 and ground truth set 114. As used herein a loss term may refer to a part, summand or an expression included in a loss function. First loss term 138 may include one or more of, for example:

an adversarial loss term for the generated multi-view images. The adversarial loss term may be generated, for example, using a pre-trained discriminator (A) 137 that was trained on the domain of human face images, or calculated based on the probabilities returned by the discriminator network (A) 137. A discriminator (A) 137 in a generative adversarial network (GAN) may be or may include a classifier that may try to distinguish real data from the data created by the generator of the GAN, e.g., return the probability that the generated image is a real image. Discriminator (A) 137 may use any network architecture appropriate for classifying images. In this application, only the discriminator (A) 137 of a pretrained GAN network may be used for generating the adversarial loss term. Other classifiers may be used.

a perceptual loss, comparing the generated multi-view images 134 with the ground truth multi-view images 114, representing the same head poses. The perceptual loss may measure the difference between the high-level features of two images, e.g., an image from generated multi-view images 134 and a corresponding image from ground truth set 114.

The perceptual loss between generated multi-view images 134 and ground truth multi-view images 114 may include a combination (e.g., a sum an average, etc.) of the perceptual loss between pairs of corresponding images from generated multi-view images 134 and ground truth multi-view images 114.

Network (F) 130 may be an NN pretrained to obtain multi-view images of a face, and generate a 3D head model from the set. In this application, network (F) 130 may obtain generated multi-view images 134 and generate or reconstruct a 3D face model 140, including 3D mesh 142 and UV texture map 144.

For training purposes, the generated 3D face model 140 may be fed into renderer 150, e.g., a differentiable renderer or other type of renderer, that may render or derive a rendered multi-view images 154. In some embodiments, renderer 150 may be designed to render facial images having the same camera angles and head poses as in the ground truth sets 114. For example, if ground truth set 114 includes a front image, a profile image, a top image and a back image of the face as in the example provided herein, rendered multi-view images 154 may also include a generated front image corresponding to the ground truth front image, a generated profile image corresponding to the ground truth profile image, a generated top image corresponding to the ground truth top image, and a generated back image corresponding to the ground truth back image.

Second loss term calculation 156 may calculate second loss term 138 based on differences between rendered multi-view images 154 and ground truth set 114. Second loss term 158 may include one or more of:
- a mesh-regularization term, calculated based on a distance between mesh vertices of 3D mesh 142 of the face and a 3D mesh of a canonical 3D face model of the face, e.g., a FLAME 3D face model of the face or other known 3D face model of the face.
- one or more parameter regularization terms of 3D face model 140 of the face,
- a perceptual loss between images in rendered multi-view images 154 and generated multi-view images 134.

Regularization loss may refer to an additional term added to the loss function, and may include Lasso regularization (L1), e.g., adding the penalty equivalent to the sum of the absolute values of coefficients. Ridge regularization (L2), e.g., adding the penalty equivalent to the sum of the squares of the magnitude of coefficients, or other regulation terms.

First loss term 138 and/or second loss term 158, may be used, e.g., may terms in a loss function, to train the hypernetwork (H) 120, e.g., to adjust weights and other coefficients hypernetwork (H) 120, e.g., in a back propagation process. Other loss terms may be used, e.g., a reconstruction loss between generated multi-view images 134 and ground truth set 114 and/or between rendered multi-view images 154 and ground truth set 114 may be used as a part of the loss function. The reconstruction loss may measure how close the system output is to the original input, and may be calculated or computed using a distance metric, e.g., mean-squared error (MSE), cross-entropy, L1 loss, e.g., the median absolute error (MAE), or L2 loss, e.g., the root mean squared error (RMSE).

Figure 2:
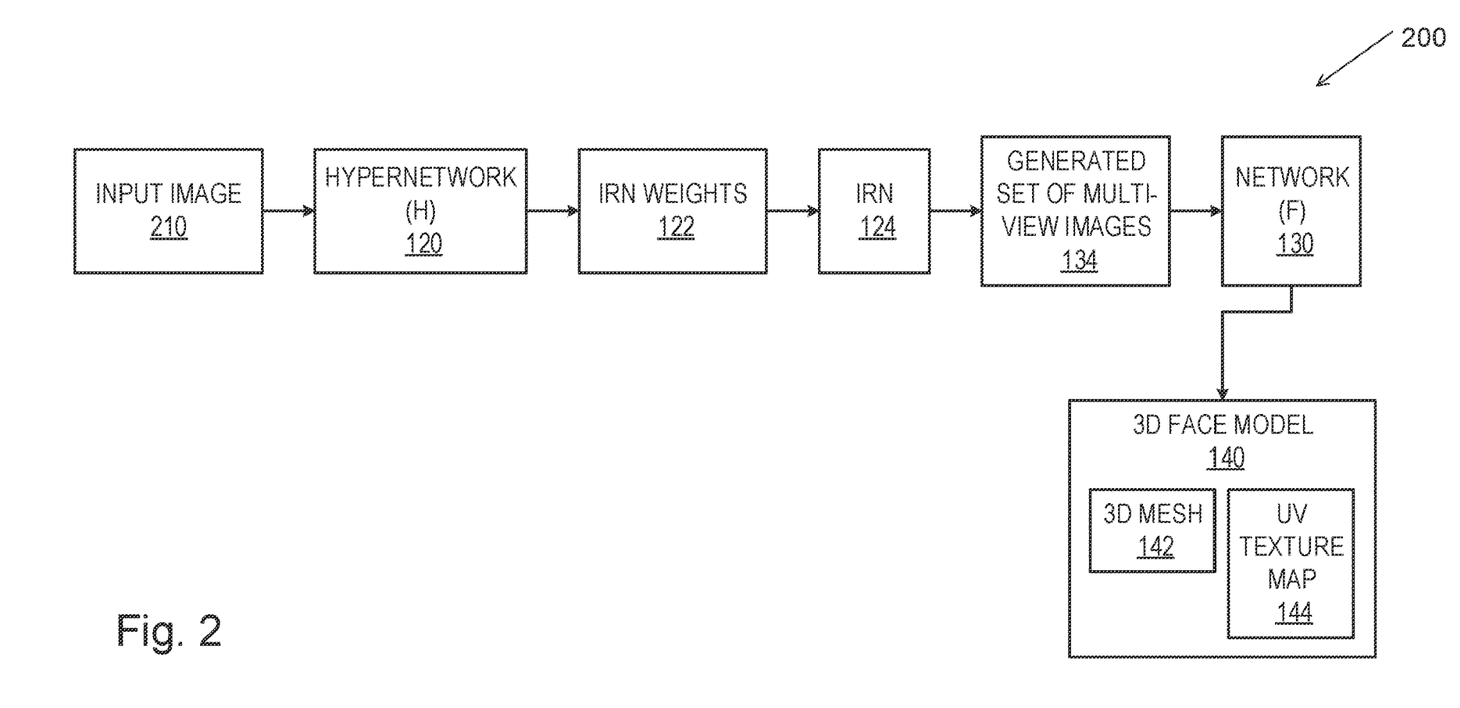
FIG. 2 depicts a system for reconstructing a three-dimensional (3D) face model from an input 2D image, according to embodiment of the invention.

Reference is made to FIG. 2, which depicts a system 200 for reconstructing a three-dimensional (3D) face model 140 from an input 2D image 210, according to embodiment of the invention. It should be understood in advance that the components, and functions shown in FIG. 2 are intended to be illustrative only and embodiments of the invention are not limited thereto. While in some embodiments the system of FIG. 2 is implemented using systems as shown in FIG. 5, in other embodiments other systems and equipment can be used. System 200 includes some components of system 100 that will be given the same reference numerals.

Input image 210, e.g., a new 2D facial image, may be provided or fed into already trained hypernetwork (H) 120 that may generate weights 122 for IRN 124. IRN 124 may generate multi-view face images 134 of the face in input image 210. Multi-view face images 134 may be provided or fed into network (F) trained to generate a 3D face model 140 from multi-view face images. In some embodiments only a single input image 210 may be provided or fed into hypernetwork (H) 120. In some embodiments more than one (e.g., two or three) input images 210 may be provided or fed into hypernetwork (H) 120.

Figure 3:
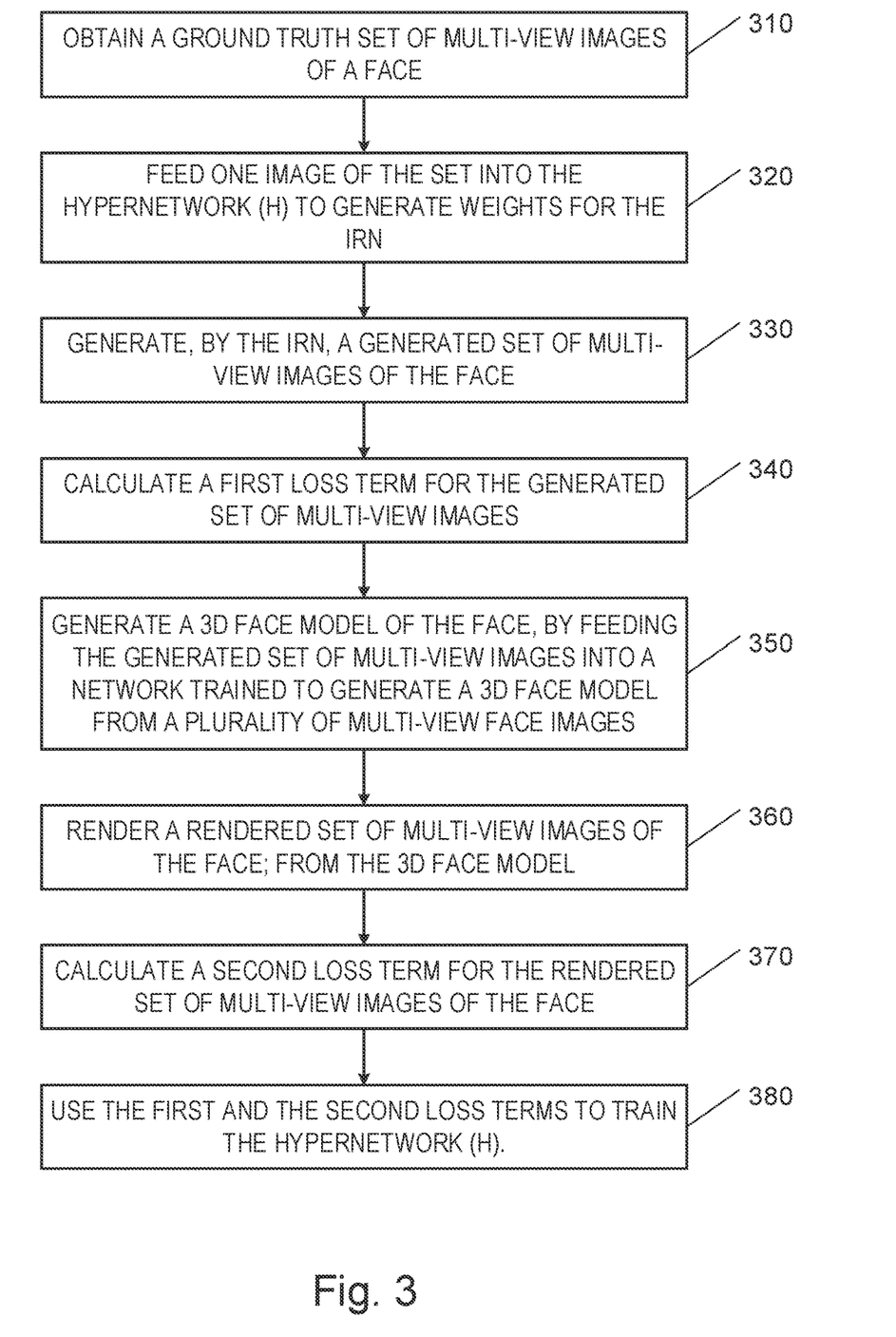
FIG. 3 is a flowchart of a method for training hypernetwork (H), according to embodiment of the invention.

Reference is now made to FIG. 3, which is a flowchart of a method for training hypernetwork (H), according to embodiments of the invention. While in some embodiments the operations of FIG. 3 are carried out using systems as shown in FIGS. 1-2 and 5, in other embodiments other systems and equipment can be used.

In operation 310, a processor (e.g., processor 705 depicted in FIG. 5) may obtain or generate ground truth multi-view images of a face. The ground truth multi-view images may be obtained, for example, form a dataset of multi-view facial images, or generated from a video clip of moving heads. In some embodiments, the multi-view images may include constant view images. In operation 320, the processor may feed one image of the set into the hypernetwork (H) (e.g., hypernetwork (H) 120 depicted in FIG. 1) to generate weights for an IRN (e.g., IRN 124). In some embodiments, the processor may feed more than one images of the set into the hypernetwork (H). In operation 330, the processor may generate generated multi-view images of the second face using the IRN with the weights generated by the hypernetwork (H). In some embodiments, the generated multi-view images may include facial images in the same constant views as the ground truth multi-view images. In operation 340, the processor may calculate a first loss term for the generated multi-view images of the face. For example, an adversarial loss term for the generated multi-view images, and a perceptual loss, comparing the generated multi-view images with the ground truth multi-view images may be calculated. Other loss terms may be calculated.

In operation 350, the processor may generate or reconstruct a 3D face model of the face, by feeding the generated multi-view images into an NN, e.g., network (F) trained to generate a 3D face model from multi-view face images. In some embodiments, the 3D face model may include a 3D mesh and a texture UV map. In operation 360, the processor may render or derive a rendered multi-view images of the face; from the 3D face model. In some embodiments, the rendered multi-view images may include facial images in the same constant views as the ground truth multi-view images. In operation 370, the processor may calculate a second loss term for the rendered multi-view images of the face, based on differences between the rendered multi-view images and the ground truth set. The second loss term may include, for example, a mesh-regularization term, calculated based on a distance between generated mesh vertices of the 3D mesh of the face and mesh vertices of a canonical 3D face model of the face, e.g., a FLAME 3D face model of the face or other known 3D face model of the face, one or more parameter regularization terms of the 3D face model of the face, and a perceptual loss between images in the rendered multi-view images and the generated multi-view images. Other loss terms may be calculated. In operation 380, the processor may train hypernetwork (H) e.g., to adjust weights and other coefficients hypernetwork (H), e.g., in a back propagation process. The processor may generate a loss function with the loss terms calculated in operations 340 and 370, and use the loss function to train hypernetwork (H). The process described in FIG. 3 may be repeated until hypernetwork (H) is fully trained, e.g., until a stop criteria is met, for example, if one or more of the calculated loss terms are below a threshold. Other stop criteria may be used.

Figure 4:
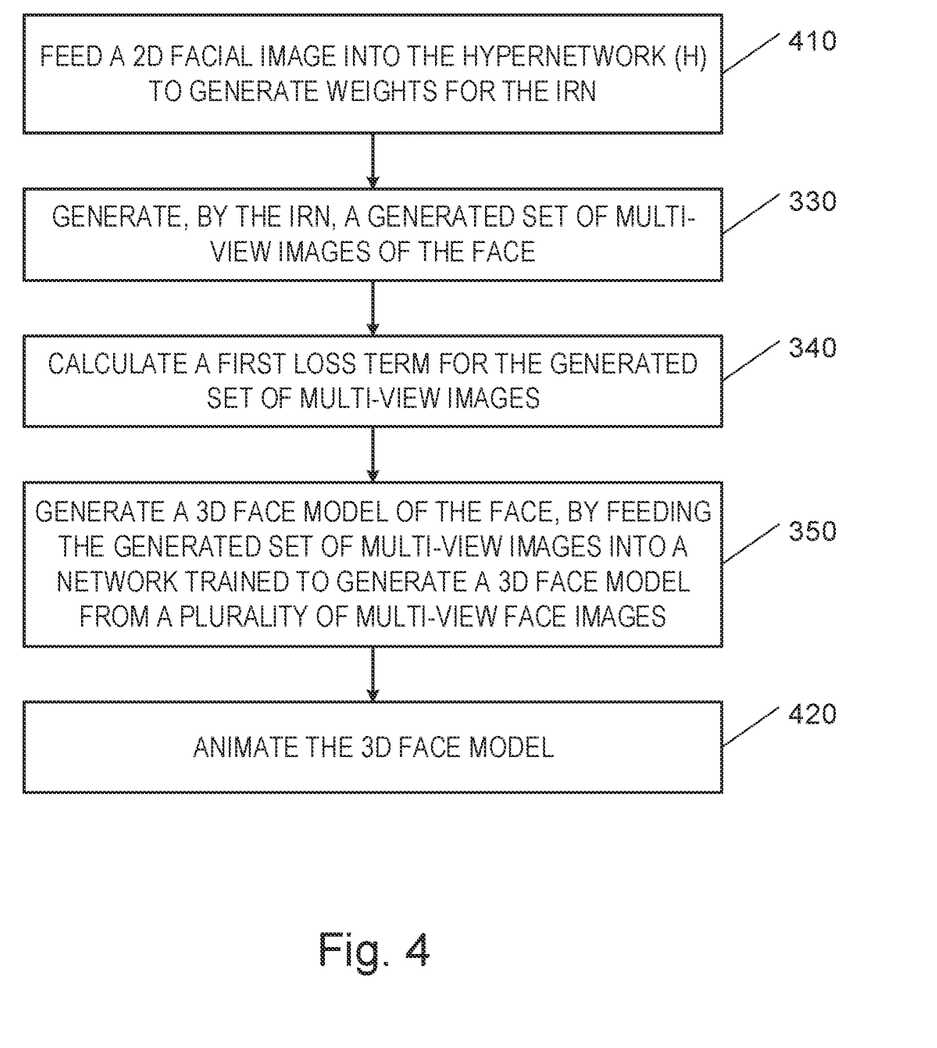
FIG. 4 is a flowchart of a method for reconstructing a 3D model of a face from an input 2D image of the face, according to embodiment of the invention.

Reference is now made to FIG. 4, which is a flowchart of a method for reconstructing a 3D model of a face from an input 2D image of the face, according to embodiments of the invention. While in some embodiments the operations of FIG. 4 are carried out using systems as shown in FIGS. 1-2 and 5, in other embodiments other systems and equipment can be used. Some operations in embodiments of the method for reconstructing a 3D model of a face from an input 2D image of the face are similar to operations of embodiments of the method for training hypernetwork (H) presented in FIG. 3, these operations will be given the same reference numerals.

In operation 410, a processor (e.g., processor 705 depicted in FIG. 5) may feed a 2D facial image (e.g., a new 2D facial image) into a hypernetwork (H) (e.g., hypernetwork (H) trained using embodiments of the method for training hypernetwork (H) presented in FIG. 3) to generate weights for the IRN. In some embodiments, the processor may feed more than one image into hypernetwork (H). Next, operations 330-350 already described may be performed to generate or reconstruct a 3D face model of the face provided in operation 310. In operation 420, the processor may use the 3D face model generated in operation 350 to create a new animation. For example, the processor may reenact the 3D face model using input videos of other characters, by regressing the 3D face model parameters from frames in the input video (e.g., using an NN), then applying them to the 3D face model generated in operation 350 and rendering the outcomes.

FIG. 5 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as systems 100 and 200 and other modules or equipment mentioned herein may be or include, or may be executed by, a computing device such as included in FIG. 5 or specific components of FIG. 5, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g., code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, images, training data, NN weights and parameters etc. may be stored in a storage 730 and may be loaded from storage 730 into a memory 720 where it may be processed by processor 705. Some of the components shown in FIG. 5 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for reconstructing a three-dimensional (3D) model of a first face from an input two-dimensional (2D) image of the first face, the method comprising:
   training a hypernetwork (H) by:
      obtaining ground truth multi-view images of a second face;
      feeding one image of the ground truth multi-view images of the second face into the hypernetwork (H) to generate weights for the IRN;
      generating, by the IRN, generated multi-view images of the second face;
      calculating a first loss term for the generated multi-view images of the second face;
      generating the 3D face model of the second face, by feeding the generated multi-view images into the network trained to generate a 3D face model from the generated multi-view face images;
      rendering, from the 3D face model of the second face, rendered multi-view images of the second face;
      calculating a second loss term for the rendered multi-view images of the second face; and
      using the first and the second loss terms to train the hypernetwork (H);
   feeding the input 2D image of the first face into the hypernetwork (H) to generate weights for an implicit representation network (IRN);
   generating, by the IRN with the generated weights, multi-view face images of the first face; and
   generating the 3D model of the first face by feeding the multi-view face images of the first face into a network trained to generate a 3D face model from the multi-view face images.

2. The method of claim 1, wherein the first loss term comprises one or more of:
   an adversarial loss term for the generated multi-view images generated using a pre-trained discriminator (A) that was trained on the domain of human face images, and
   a perceptual loss, comparing the generated multi-view images with the ground truth multi-view images, representing the same head poses.

3. The method of claim 1, wherein the second loss term comprises one or more of:
   a mesh-regularization term, calculated based on a distance between mesh vertices of the 3D face model of the second face and a canonical 3D face model of the second face,
   parameter regularization term of the 3D face model of the second face, and
   a perceptual loss between rendered images and the ground truth multi-view image.

4. The method of claim 3, wherein the canonical 3D face model of the second face is a faces learned with an articulated model and expressions (FLAME) 3D face model of the second face.

5. The method of claim 1, comprising:
   selecting a videoclip of a moving face from dataset of videoclips; and
   sampling the ground truth multi-view images of the second face from the selected videoclip.

6. The method of claim 1, wherein images in the generated multi-view images of the second face and the rendered multi-view images of the second face represent the same head poses as images the ground truth multi-view images of the second face.

7. The method of claim 1, wherein the 3D model of the first face comprises a 3D mesh and a texture UV map.

8. A method for generating a three-dimensional (3D) model of a first face from an input two-dimensional (2D) facial image of the first face, the method comprising:
   training the hypernetwork (H) by:
      obtaining a plurality of ground truth images of a second face, each with a different view of the second face;
      providing one image of the plurality of ground truth images of the second face to the hypernetwork (H) to generate weights for the IRN;
      generating, by the IRN, a plurality of generated images of the second face, each with a view of the second face that corresponds to a view of the second face in one image of the plurality of ground truth images of a second face;
      calculating a first loss term for the plurality of generated images of the second face;
      reconstructing the 3D face model of the second face, by providing the plurality of generated images of the second face to the network trained to generate a 3D face model from the plurality of generated images of the second face;
      rendering, from the 3D face model of the second face, a plurality of rendered images of the second face, each with a view of the second face that corresponds to a view of the second face in one image of the plurality of ground truth images of a second face;
      calculating a second loss term for the plurality of rendered images of the second face; and
      using a loss function comprising the first and the second loss terms to train the hypernetwork (H);
   providing the input 2D facial image to a hypernetwork (H) to generate weights for an implicit representation network (IRN);
   generating, by the IRN with the generated weights, a plurality of facial images of the first face, each with a different view of the first face; and
   reconstructing the 3D model of the first face by providing the plurality of facial images of the first face to a network trained to generate a 3D face model from the plurality of facial images.

9. A system for reconstructing a three-dimensional (3D) face model from an input 2D image of the face, the system comprising:
   a memory; and
   a processor configured to:
   train the hypernetwork (H) by;
      obtaining ground truth multi-view images of a second face;
      feeding one image of the ground truth multi-view images of the second face into the hypernetwork (H) to generate weights for the IRN;
      generating, by the IRN, generated multi-view images of the second face;
      calculating a first loss term for the generated multi-view images of the second face;
      generating the 3D face model of the second face, by feeding the generated multi-view images into the network trained to generate a 3D face model from the generated multi-view face images;
rendering, from the 3D model of the second face, rendered multi-view images of the second face;
calculating a second loss term for the rendered multi-view images of the second face; and
using the first and the second loss terms to train the hypernetwork (H);
feed the input 2D image of the first face into a hypernetwork (H) to generate weights for an implicit representation network (IRN);
generate, by the IRN with the generated weights, multi-view face images of the first face; and
generate the 3D model of the first face by feeding the multi-view face images of the first face into a network trained to generate a 3D face model from the multi-view face images.

10. The system of claim 9, wherein the first loss term comprises one or more of:
an adversarial loss term for the generated multi-view images generated using a pre-trained discriminator (A) that was trained on the domain of human face images, and
a perceptual loss, comparing the generated multi-view images with the ground truth multi-view images, representing the same head poses.

11. The system of claim 9, wherein the second loss term comprises one or more of:
a mesh-regularization term, calculated based on a distance between mesh vertices of the 3D face model of the second face and a canonical 3D face model of the second face,
parameter regularization term of the 3D face model of the second face, and
a perceptual loss between rendered images and the ground truth multi-view image.

12. The system of claim 11, wherein the canonical 3D face model of the second face is a faces learned with an articulated model and expressions (FLAME) 3D face model of the second face.

13. The system of claim 9, wherein the processor is further configured to:
select a videoclip of a moving face from dataset of videoclips; and
sample the ground truth multi-view images of the second face from the selected videoclip.

14. The system of claim 9, wherein images in the generated multi-view images of the second face and the rendered multi-view images of the second face represent the same head poses as images the ground truth multi-view images of the second face.

15. The system of claim 9, wherein the 3D model of the first face comprises a 3D mesh and a texture UV map.

* * * * *